United States Patent Office 3,300,811
Patented Jan. 31, 1967

3,300,811
PLASTIC EXTRUDING MACHINES
Pierre Amédée Berger, Firminy, Loire, France, assignor to Compagnie des Ateliers et Forges de la Loire (St. Chamond-Firminy-St. Etienne-Jacob-Holtzer), Paris, France
Filed Apr. 22, 1965, Ser. No. 450,062
Claims priority, application France, Sept. 3, 1964, 986,988, Patent 1,414,025
8 Claims. (Cl. 18—12)

This invention relates to extruding machines or mills as used in the processing of plastic materials, this latter term being used in the present specification and claims to designate broadly any highly viscous or pasty material, including natural and synthetic rubber mixes and other natural and synthetic compounds.

A great variety of such extruding machines have been disclosed and patented. Usually such machines will comprise an elongated, cylindrical casing having one or more worm-like rotors rotatable therein. The plastic composition is fed into an input section of the casing through a feed hopper or the like and is taken up into the helical working space defined between the screw threads of the worm rotor and the surrounding inner surface of the casing. As the rotor revolves, the material is thus fed in a general axial direction through the working space and into an output section of the machine, which usually compises a shaping die orifice, and is extruded therethrough. During the feed of the material through the helical working space of the worm-like rotor, the material is, ideally, subjected to a thorough milling and kneading action which serves to perform the desired processing functions, such as mixing or homogenizing, plasticizing, de-gassing, setting or polymerizing, and the like, treatments.

The precise nature of the treatment which the plastic compositions undergo in a machine of this kind is complex and depends on a number of parameters. These include inter alia the pitch of the rotor threads, the angular relationship and relative velocities of the rotor and casing surfaces with which the material is in contact, the degree to which the helical working space is filled with material, the surface condition and friction coefficients of those surfaces relative to the material, and of course the temperature and pressure conditions obtaining in the working zone.

It is therefore apparent that it would be desirable, in a machine of the class referred to, to provide for efficient control over such parameters in order to achieve optimum conditions for a given treatment, in dependency on the purpose of the treatment and the nature of the composition being treated. It is an object of this invention to improve such control, more particularly in regard to the degree to which the working space is filled with material. Thus, in some types of treatment such as mixing and plasticizing, it may be desirable to effect maximum filling and compacting of the compound in the working space in order to impart the highest value to the apparent density in the extruded product. In other types of treatment, primarily de-gassing, it is desirable to fill the working space only partly with the material so as to reduce the compacity of the material while in the work space or even to provide a free boundary of the mass of material exposed to a vacuum created in the work space, and thereby promote the withdrawal of gaseous inclusions present in the mass, this in turn tending to increase the apparent density of the final extruded product in cases where such inclusions are initially present in the feed stock. The invention makes it possible to achieve these varying conditions with an unprecedented degree of flexibility.

In the input section of a milling or extruding machine of the class to which the invention relates, it is frequently found difficult to accomplish a smooth and uniform rate of feed of the material from the feed hopper (or other feeder device) into the working space of the machine. Said input section usually includes therein an input worm section of the rotor, which serves to draw in the material as it is fed into the casing from the hopper and carry it along the working section of the rotor worm. In practice it is often found that the input worm section does not properly perform its function of continuously and smoothly aspirating the material from the feed hopper, thereby producing interruptions in the feed of material through the machine. An object of the invention is to overcome this defect and ensure a continuous unbroken feed at all times thereby improving the control over the rate and generally improving the operation of the machine. An additional object is to subject the material to an efficient pre-treatment in the input section of an extruding machine.

In accordance with a basic aspect of the invention, there is provided a plastic-extruding machine comprising (in a generally conventional manner, a casing, e.g. of cylindrical shape, having an input section, a processing or working section, and an output or extrusion section. In the processing section there is provided a worm and means for rotating the worm to extrude plastic material fed thereto from said input section, into and through the output section. The improvement of the invention then resides in providing, in the input section, a set of coaxial input rotor members including an inner member and an outer member, said outer member having means defining a helical screw thread surface closely surrounding said inner member, and means for rotating said inner and outer members at independently selectable velocities.

The inner one of the input rotor members may constitute a worm having an external screw thread, or it may be smooth, while the outer input rotor member, in a desirable embodiment of the invention, may comprise a length of helically wound wire or other helically wound stock, closely surrounding the screw threaded or smooth periphery of the input member, and rotatable independently therefrom. However, the outer one of the input rotor members may alternatively comprise a tubular member having an internal screw thread closely surrounding the screw thread of the inner member, and rotatable independently therefrom.

It will be understood that by rotating the outer input rotor member of the invention at a suitably selected angular velocity different from that of the inner member, it is possible to control the feed conditions of the material through the input section and into the processing section of the machine much more closely and precisely than is otherwise possible, as well as imparting an effective pre-treatment to the material.

Exemplary embodiments of the invention will now be described for purposes of illustration but not of limitation with reference to the accompanying drawings, all of which are simplified views in axial cross section of extruding mills constructed in accordance with the invention. Specifically, FIG. 1 shows an improved machine or mill having a worm-like inner input rotor member and a single helical outer input member;

Figure 1:
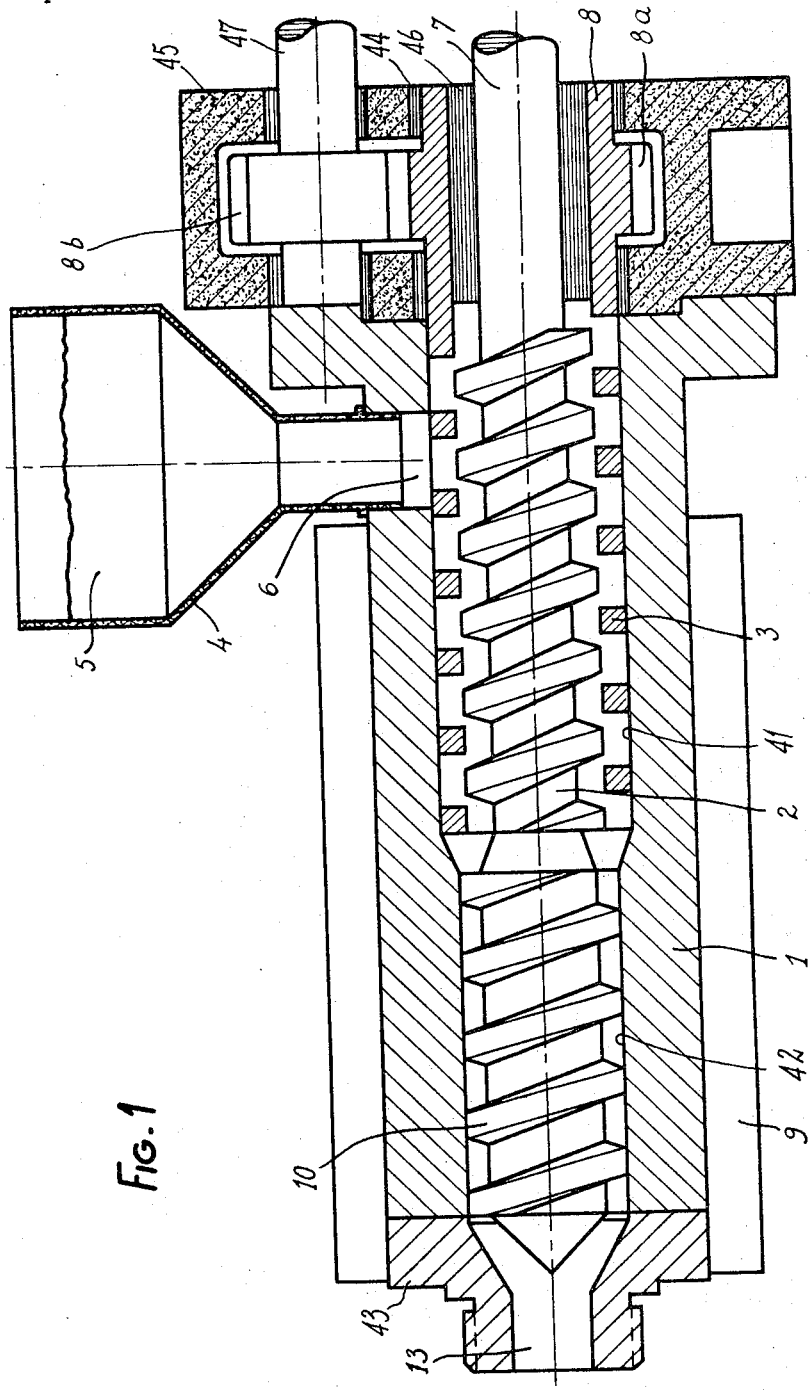

The extruding machine or mill shown in FIG. 1 includes a casing member 1 which has a stepped bore therein, including an input bore section 41 of larger diameter and a processing bore section 42 of somewhat smaller diameter. An end plate 43 is suitably secured, through means not shown, to the output end of the casing 1 and defines an opening 13 coaxial with the bores 41, 42 and constituting the output section of the machine. A die plate having a suitable extrusion orifice, not shown, may be mounted within opening 13.

A rotor member is rotatable within the casing 1 and includes three integrally interconnected sections: a supporting shaft section 7, rotatably supported in the machine frame, an input worm section 2, positioned within the bore section 41, and a processing worm section 10 positioned within the bore section 42. The processing worm section 10 is formed with screw threads, herein trapezoidally shaped, which closely engage, with suitable rotational clearance the inner cylindrical surface of the bore section 42. The input worm section 2 is also formed with screw threads, herein trapezoidally shaped and similar in pitch to the screw threads of the processing section, but having their peripheral surfaces spaced radially inwardly from the inner cylindrical surface of bore section 41. The two worm or auger sections 2 and 10 are shown interconnected by a short taper section of the rotor shaft.

An opening 6 formed in the upper part of casing 1 near the input extremity of the bore 41, receives the lower outlet of a feed hopper 4 adapted to contain a body of the material 5 to be treated. The reference 9 schematically indicates temperature control means surrounding the casing 1, and this may include coils or jacketing for circulating temperature control fluid, and/or electrical resistors or other conventional heating means.

Positioned in the input bore section 41 and coaxially surrounding the input rotor section 2, is an outer input rotor member 3 here shown as a helical member 3 of substantially square cross section. The turns of the helical member 3 surround the periphery of the screw thread of worm 2 and are positioned in the annular space between said periphery and the inner surface of bore 41, as herein shown closely adjacent to said surface. The helical member 3 is firmly secured, through any suitable means not shown, at its input end, with a cylindrical sleeve 8 which is journalled for rotation by means of bearings schematically indicated at 44, in a stationary frame 45 of the machine having the casing 1 secured to one of its sides. Within the bore of sleeve 8 is another bearing schematically indicated at 46, and serving to journal the rotor shaft 7 for rotation both relative to the sleeve 8 and member 3. A shaft 47 is journalled in the frame 45 by means of suitable bearings and carries a gear 8b which meshes with a gear 8a formed or secured around the sleeve 8.

It will be understood that rotor shaft 7 in operation is connected to a source of mechanical power, not shown, while shaft 47 may be coupled to the same or a different source, so as to rotate the outer helical member 3 through gearing 8b–8a, at an angular speed which can be suitably predetermined preferably adjustably, with respect to the angular speed of the inner rotor member 2.

There are many different ways of correlating the differential rotations of the inner and outer input rotor members 2 and 3 while still ensuring that the net result of such rotation will generate an axial thrust applied to the material fed from hopper 4 through feed opening 6, so as to propel said material axially (herein leftward) through input bore section 41 and into the processing section 42 there to be subjected to the action of the processing rotor member 10. Thus, depending on the optimum conditions desired, the outer helical member 3 may be rotated in the same sense as the inner member 2 at a faster or at a slower rate than it, or it may be rotated in a direction reverse from that of the inner member. Also, the pitch of the outer helix 3 may be similarly or reversely handed with respect to the pitch of the thread of inner worm 2. In one useful arrangement, both the pitch and the sense of rotation of the outer member 3 may be reverse from the pitch and sense of rotation of inner member 2. The particles of plastic material 5, e.g. grains of monomer material, are then subjected to intense mixing and milling between the two helical surfaces of the input rotor assembly 2 and 3, as they travel towards the processing section under the net axial force applied to them. In the processing section, the pre-milled particles are milled between the screw threads of worm 10 and the surface of bore 42 and may be caused to gel or set, and are symmetrically propelled into and through the die orifice at 13.

By controlling the relative angular velocity of the outer input rotor member 3 with respect to the bodily angular velocity of the inner rotor member (which herein includes both the input worm section 2 and the processing worm section 10), the rate of feed of material from feeder opening 6 into the processing section can be accurately controlled, and the feed rate can be uniformly held at a prescribed value such as to ensure a desired degree of filling of the material in the work space defined around the processing screw 10. In most cases it will be desirable to maintain this degree of filling at a uniform maximum value.

Figure 2:
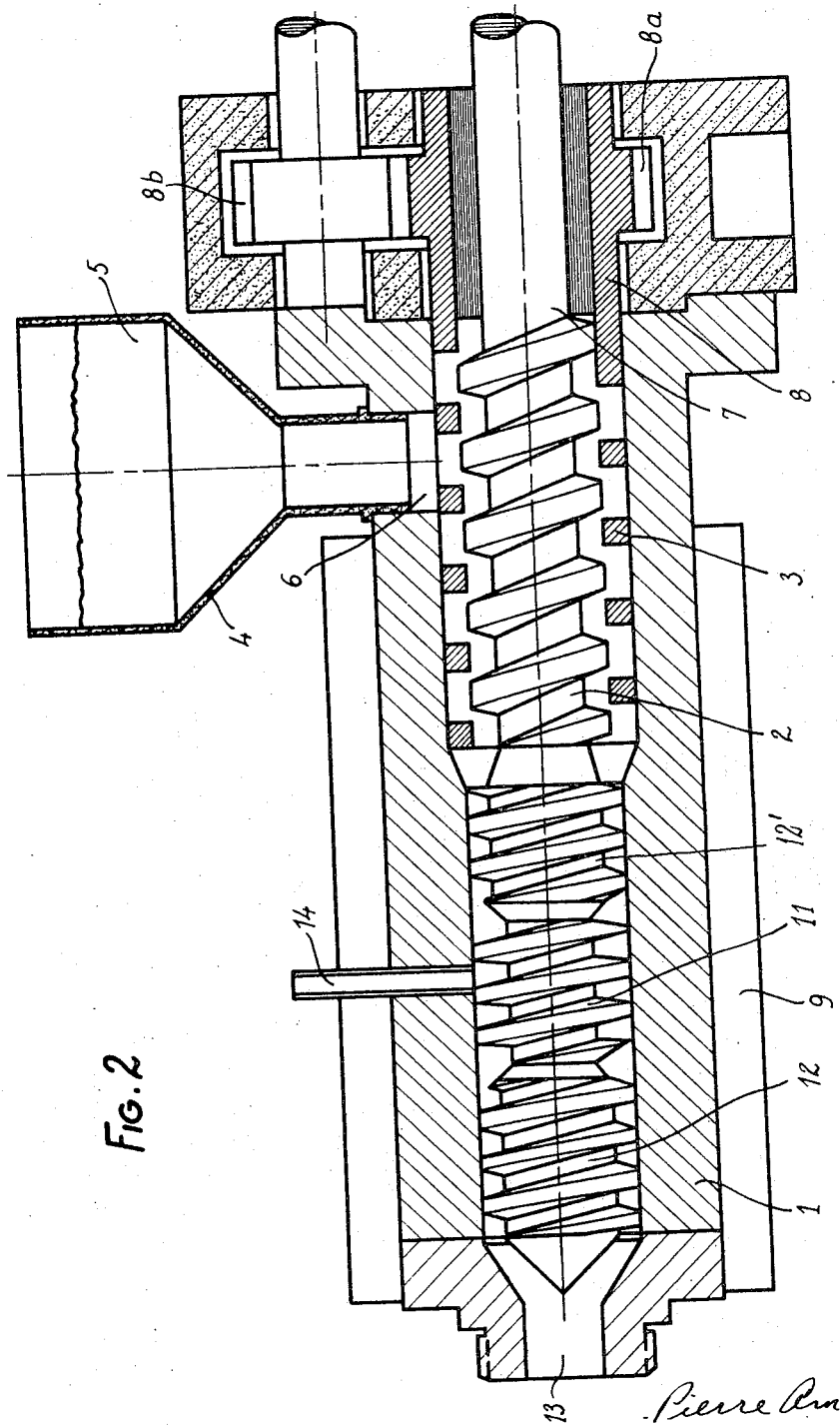
FIG. 2 shows a similar machine embodied in a de-gassing mill.

The modified machine shown in FIG. 2 is generally similar to the machine just described and corresponding parts therein have been designated by the same numerals. In this case however the working or processing section of the machine is designed to apply a degassing action to the material fed through it. For this purpose, the processing worm is of non-uniform pitch and includes an initial section 12' of short pitch followed by an intermediate section 11 of longer pitch followed by a final section 12 having a short pitch similar to that in the initial section. A conduit 14 extends through the wall of casing 1 and opens into the intermediate part of the processing section, the outer end of the conduit being connected in operation to a suitable source of vacuum. It will be noted that with such an arrangement of the processing section the material is decompressed as it passes through the intermediate section 11 of the processing space owing to the longer pitch of the screw thread therein, while the material present in the initial and final parts 12' and 12 of the processing space provides effective vacuum seals at both ends of the intermediate working space 11 exposed to vacuum, such seals being due to the relatively shortened pitch of the worm threads in said initial and final parts. Owing to the de-compressed state of the material within the intermediate section 11, gaseous inclusions present therein are readily eliminated by the action of the vacuum to which the material is exposed and are withdrawn through the pipe 14.

Here again the outer helical input rotor member 3 of the invention is rotated differentially with respect to the inner input rotor member or worm 2, so as to establish a desired uniform rate of feed, which in this case may be so regulated as to ensure a complete filling of the work space in the initial and final portions 12' and 12 thereof, and a prescribed lower degree of filling in the intermediate part 11 of the work space.

Figure 3:
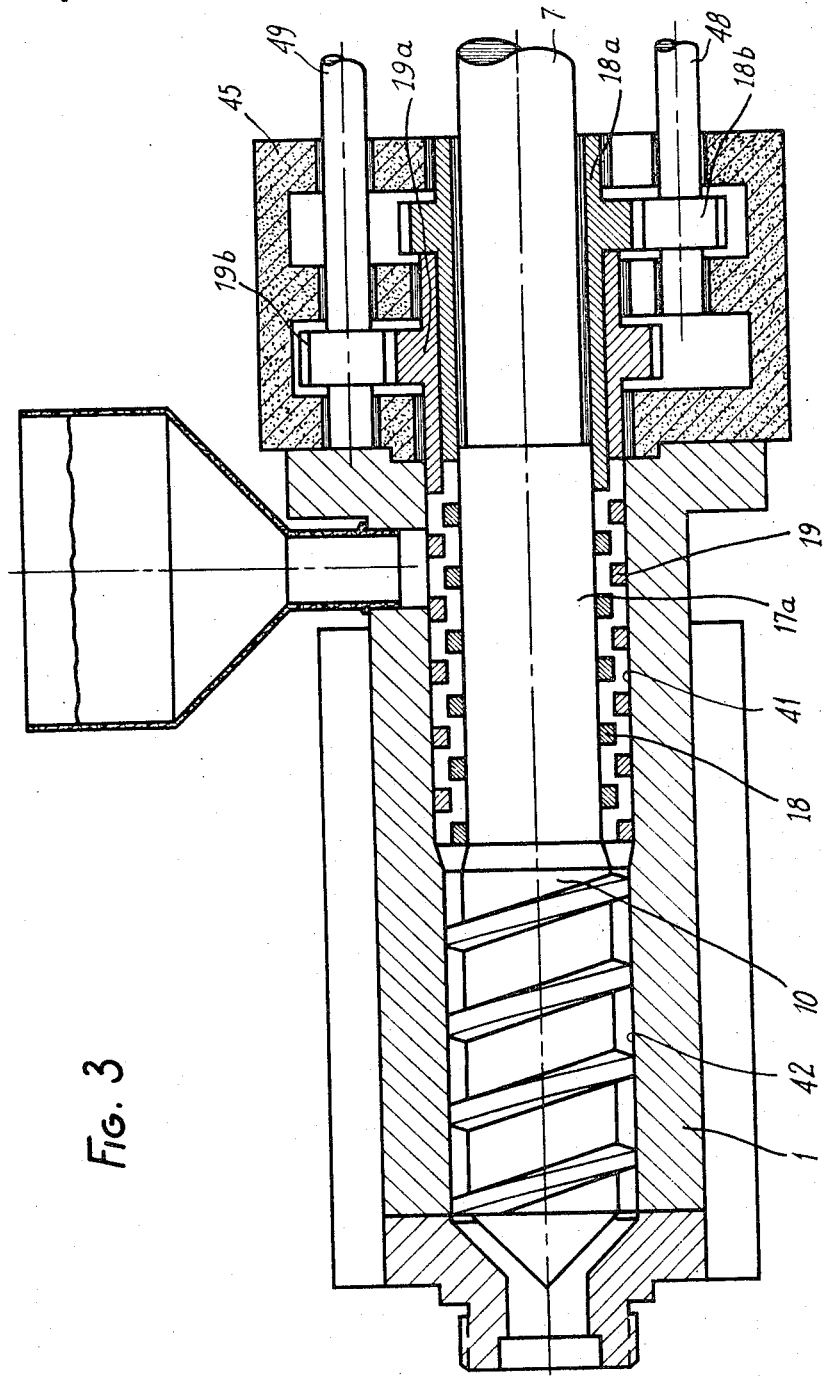
FIG. 3 shows a modified mill having a smooth inner input rotor member and two helical outer input members.

In the modified embodiment of FIG. 3, the main rotor member, which includes the drive shaft portion 7 journalled in the machine frame and the processing worm section 10 in the bore section 42 of the casing 1, as in the embodiment of FIG. 1, differs in that the section 17a of said rotor member positioned in the input bore section 41 is smooth, rather than threaded. This smooth inner rotor member 17a is surrounded coaxially by two helical outer members in accordance with the invention. A first one 18 of these outer helical members closely surrounds the smooth periphery of inner member 17a, and is attached to a sleeve 18a which rotatably surrounds the main shaft section 7 and is rotatable in the machine frame 45 by way of suitable bearing means. A gear carried by the sleeve 18a meshes with a gear 18b carried on a first auxiliary shaft 48. A second or outermost one 19 of the two helical outer members of the invention is attached to a sleeve 19a which rotatably surrounds the inner sleeve 18a and is itself rotatable in frame 45 by way of suitable bearings. A gear carried by sleeve 19a meshes with a gear 19b carried on a second auxiliary shaft 49. In this arrangement each of the auxiliary shafts 48 and 49 can be driven at a rate separately predeterminable relative to the rate at which the main rotor shaft 7 is driven, so as to impart differential rates of rotation to both helical members 18 and 19 of the invention in the same or different directions, each of which moreover may be the same or different from the rotation of the inner input rotor member 17a and processing worm member 10. This further increases the flexibility of control achievable over the rate of feed of the material towards the processing section as well as the conditions of pre-treatment to which the material is exposed in the input section.

Figure 4:
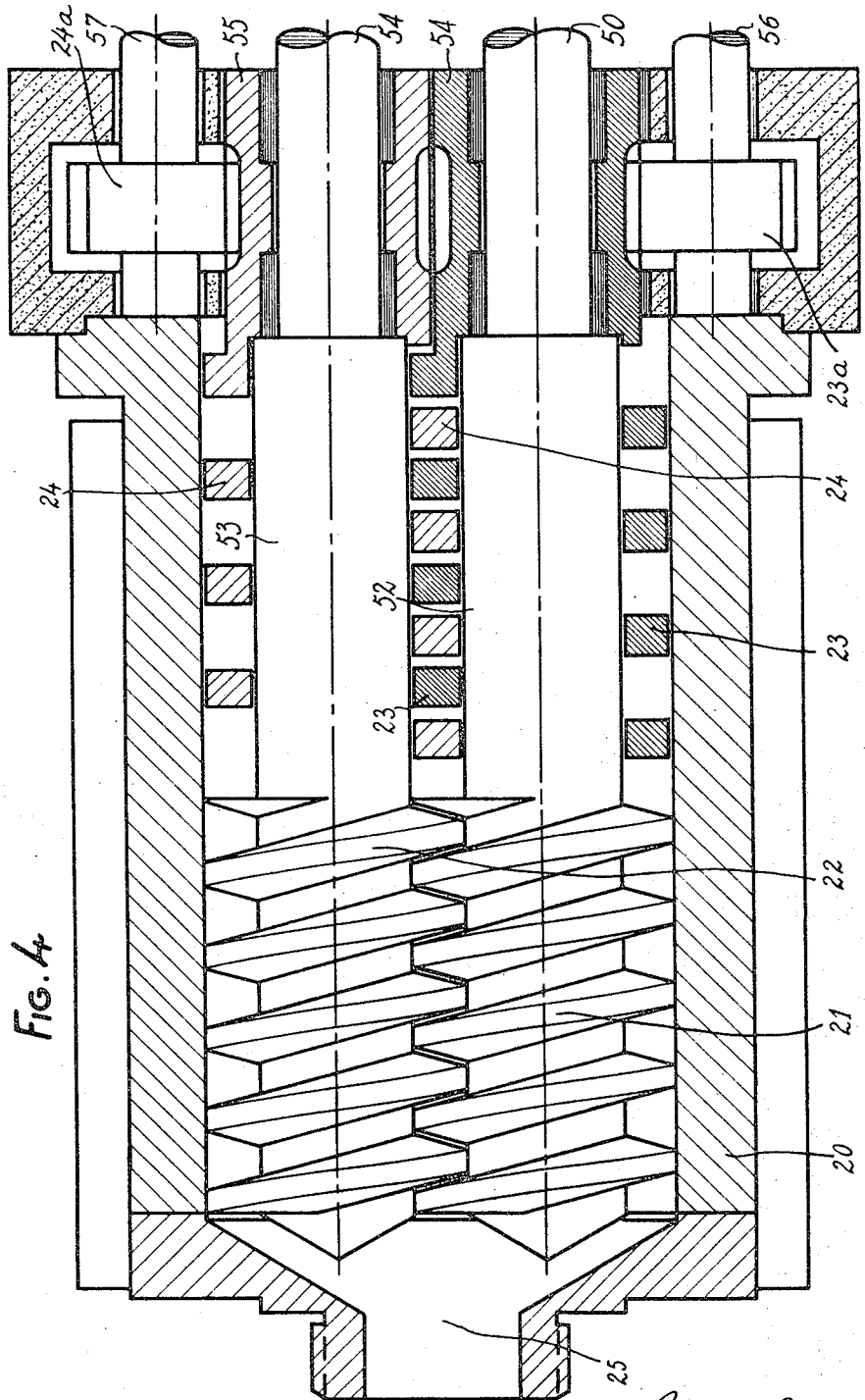
FIG. 4 shows a modification using two duplicate rotors each having a smooth inner member and a single helical outer input member, this figure being a view in horizontal section.

FIG. 4 illustrates the principles of the invention embodied in an extruding mill of the twin-rotor type. The casing 20 is recessed so as to receive therein the two rotor members in side by side relationship. Each rotor member is shown generally similar to the single rotor member used in the FIG. 3 embodiment, and includes a drive shaft section 51 and 50 (respectively), journalled in the frame, followed by a smooth cylindrical input section 52 and 53, followed in turn by a processing worm section 21 and 22. The two processing worm sections are formed with intermeshing threads as shown. The casing 20 has a common output section provided by an aperture 25 disposed centrally in relation to both rotors and containing an extrusion die plate, not shown. The smooth input section 52, 53 of each of the rotors is surrounded by a helical outer rotor member according to the invention, respectively 23 and 24. These outer members are attached to supporting sleeves 54 and 55 respectively, which are journalled for rotation in the machine frame and support the main rotor drive shafts 50 and 51 for rotation therein by means of suitable bearings, as shown. The sleeves 54, 55 are driven through gears 23a and 24a from respective auxiliary shafts 56, 57. It will be noted that the helices 23 and 24 have intermeshing turns in the area intermediate the smooth input sections 52, 53 of the twin rotors. Since FIG. 4 is a section of the machine on a horizontal plane, the material feed means are not apparent but it will be understood that said means may include a feed hopper and feed opening in the casing, similar to what is shown for the other embodiments here disclosed. In operation, the main rotor drive shafts 50, 51 are driven at equal rates in opposite directions from a suitable source of mechanical power, and the auxiliary shafts 56, 57 are driven also at equal rates in opposite directions, in such a manner that the angular rates of the outer helical input members 23, 24 are regulable with respect to the angular rates of the related inner rotor members. As in the other embodiments of the invention, the controllable differential relationship between the outer and inner input rotor members provides an efficient means of controlling the rate of feed of the material into the processing section of the machine and the degree to which the material fills the work space in the processing section, to prescribed, uniform values.

Figure 5:
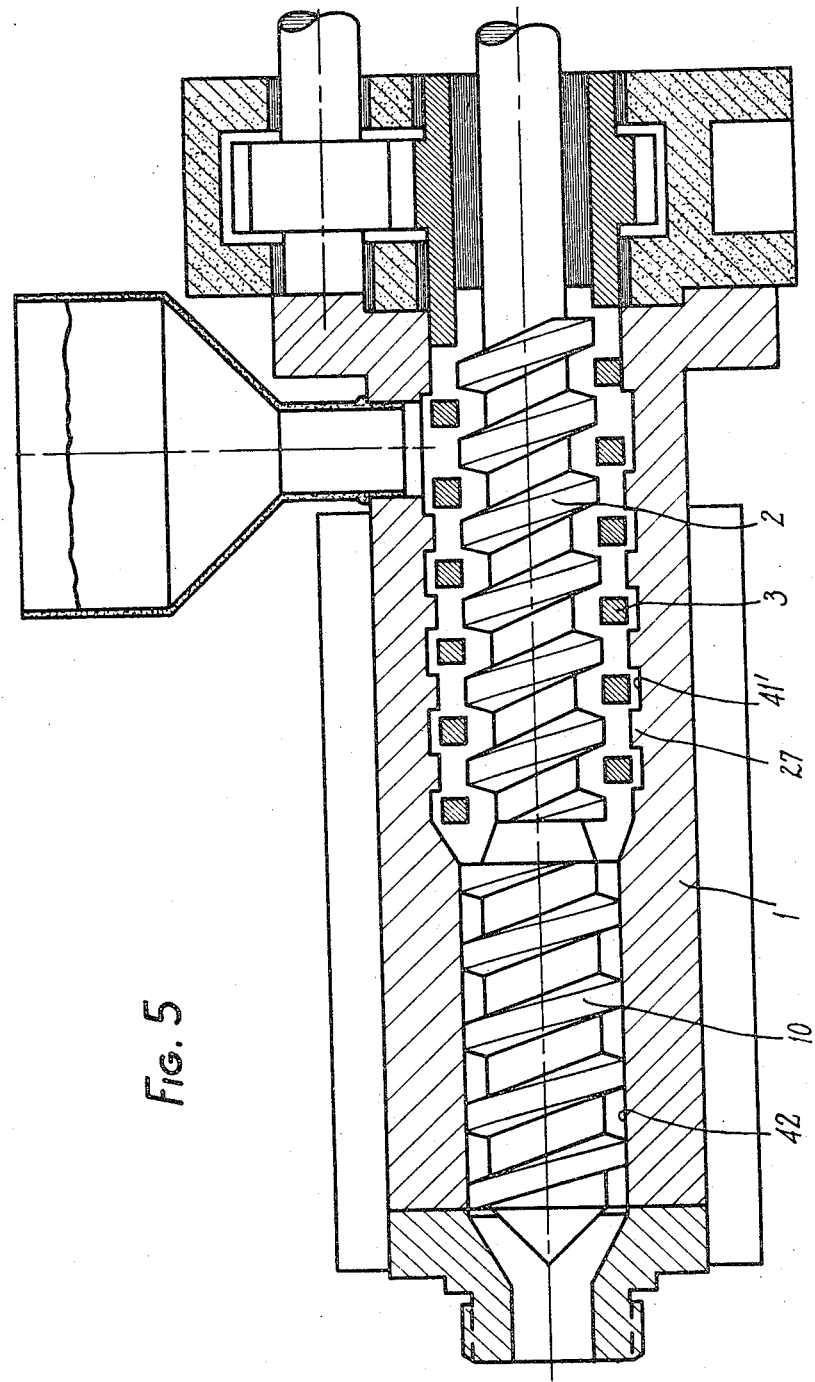
FIG. 5 shows a modification of the machine shown in FIG. 1.

The modification shown in FIG. 5 differs from the embodiment previously described with reference to FIG. 1, in that the input bore section 41' in the casing 1, instead of being smooth as in the input bore section 41 in FIG. 1, is provided with an internal screw thread 27. The pitch of this thread is preferably the same as the pitch of the helical outer input rotor member 3. In other respects the machine may be similar to the one shown in FIG. 1, or in fact similar to the machine described with reference to any of the other figures.

It will be understood that various modifications other than those specifically shown or mentioned herein may be introduced without departing from the scope of the invention. Thus, the rotor sections shown may be conical or tapered rather than having uniform diameters as shown, this statement applying both to the inner rotor members and to the outer rotor members used in accordance with the invention. The pitch of the rotor members in the input section of the machine may be non-uniform. The helical outer rotor members of the invention have here been shown in the form of simple helical members such as may be produced by helically winding a length of heavy wire or bar stock of square cross section, but various other forms may be used. Thus the cros section of the helix may be other than square, e.g. round. Further, helical outer rotor members of the invention may be provided in the form of internally threaded tubes, or tubes threaded both internally and externally, and such tubular outer rotors may be made perforate over all or part of their length, including the part thereof underlying the feed opening. It is believed that the construction of such a tubular threaded outer input rotor member will be evident without a specific illustration thereof. Various other modifications may be conceived.

What is claimed is:

1. A machine for processing plastic material comprising a casing having an input section and a processing section in serial relationship; rotor means in said casing, said rotor means including a processing rotor section positioned in said processing casing section; means for rotating said processing rotor section to feed plastic material through said processing section of the casing while working said material between cooperating surfaces of the processing rotor section and the casing; said rotor means further including an input rotor section positioned in said input section of the casing, and including an inner rotor member and an outer rotor member, said outer rotor member comprising a helix formed by a helically wound elongated element surrounding said inner rotor element; means for feeding material to said input section of the casing; a first drive means for rotating said inner rotor member and a second drive means for rotating said outer rotor member at an angular speed selectable independently of the angular speed of said input rotor member.

2. A machine for processing plastic material comprising a casing; rotor means in said casing; said rotor means including a processing screw section and means for rotating it to work material fed thereto between cooperating surfaces of said processing screw section and said casing; said rotor means further including an input section comprising an inner member and at least one coaxial outer member comprising a helix formed by a helically wound elongated element surrounding said inner member; means for feeding material into said casing adjacent said input rotor section; and drive means for differentially rotating said inner and outer input rotor members to propel said material controllably towards said processing rotor section.

3. The machine defined in claim 1 wherein said inner rotor member is smooth.

4. The machine defined in claim 1 wherein said inner rotor member is externally screw threaded.

5. The machine defined in claim 1 further including an outer-most rotor member coaxially surrounding said outer rotor comprising a helix formed by a helically wound elongated element.

6. A machine for processing plastic material comprising a casing; a rotor in the casing comprising a shaft section; an input section axially following said shaft section and a processing screw section axially following said input section; at least one outer rotor member coaxially surrounding said input rotor section comprising a helix formed by a helically wound elongated element positioned radially intermediate the outer periphery of said input rotor section and an inner surface of said casing; a tubular member secured to an axial extremity of said outer rotor member; means supporting said rotor shaft section for rotation relative to said casing; means supporting said tubular member coaxially around said shaft section for rotation both relative to said casing and relative to said shaft section; a first drive means for rotating said shaft section; and a second drive means for rotating said tubular member at a rate selectable independently of the rate of rotation of said shaft section.

7. The machine defined in claim 1, wherein said rotor means comprises a pair of rotors in parallel side-by-side relation within said casing, each rotor including a processing rotor section and an input rotor section, the input rotor section of each rotor including an inner rotor member and an outer rotor member having means defining a helical screw thread surface surrounding said inner member.

8. The machine defined in claim 7, wherein the outer rotor members of the respective rotors intermesh.

References Cited by the Examiner
UNITED STATES PATENTS

| | | |
|---|---|---|
| 858,354 | 6/1907 | Sharpneck. |
| 2,547,151 | 3/1951 | Braeseke. |
| 2,653,915 | 9/1953 | Elgin et al. _____ 18—12 |
| 3,143,767 | 8/1964 | Wirth et al. _____ 18—12 |

WILLIAM J. STEPHENSON, *Primary Examiner.*